July 1, 1941. W. H. SILVER 2,247,788
DAM FORMING DEVICE
Filed Nov. 2, 1936 3 Sheets-Sheet 1

INVENTOR
Walter H. Silver.
BY
ATTORNEYS.

Patented July 1, 1941

2,247,788

UNITED STATES PATENT OFFICE 2,247,788

DAM FORMING DEVICE

Walter H. Silver, Moline, Ill., assignor to Deere & Company, Moline, Ill., a corporation of Illinois Application November 2, 1936, Serial No. 108,759

36 Claims. (Cl. 97—55)

The present invention relates generally to agricultural implements and more particularly to damming devices used in conjunction with listers and other tillage implements. In certain parts of the country which receive but little rainfall, it has been found desirable to prepare the land so that moisture is retained in the soil and accumulated, rather than being allowed to run off as drainage.

This can be accomplished during the tilling operation by the use of a scraping tool drawn in the furrow behind each furrow-forming implement to which the scraping tool is attached. The tool has sloping side edges which are disposed at substantially the same angle to each other as the angle enclosed by the sides of the furrow. Hence as the damming scraper is drawn along the furrow it lightly engages the sides thereof and collects loose earth, which is thus accumulated in front of the tool. The tool is intermittently raised to inoperative position to deposit the pile of accumulated earth in the furrow to form a dam, after which it is again returned to earth-engaging position.

By spacing these dams at short distances in each furrow, for instance about four to eight feet apart, any rain that falls on the land is prevented from draining off and is retained in the furrows between the dams until it has time to soak into the ground, where it can be conserved for many months. It is thus desirable to connect a damming attachment to each tilling implement whenever the land is worked.

Heretofore the movement of damming tools into and out of operative position has been timed by camming mechanism connected to a ground wheel, or to some rotating shaft on the implement or on the tractor. The present invention, however, contemplates that the regularity of the spacing of dams is of less importance than the uniformity of the height of the dams. For example, when a scraper reaches a patch of comparatively hard soil, which accumulates at a slower than normal rate, it is preferable to have fewer dams of full height than regularly spaced dams of insufficient height.

It is the principal object of this invention to provide a damming attachment which forms dams of a predetermined uniform height.

Another object is to provide means for adjustably determining the height of the dams formed by the tool.

In the accomplishment of these objects, means is provided for gauging the height of the pile of accumulated earth in front of the damming tool and controlling the movement of the tool out of operating position when the height of the pile reaches the predetermined limit.

Heretofore, damming devices for use with a multi-bottomed implement have been combined in a common frame. It is desirable at times, however, to adjust the depth of one of the furrow-forming tools relative to the others, at which time it is necessary to adjust the corresponding damming tool accordingly. It is, therefore, another object of this invention to provide damming tools each of which is adjustable with the furrow-forming tool. A related object has to do with providing individual control means for the various damming tools to permit raising and lowering one damming tool without disturbing the control mechanism of the other damming tools.

A further object is to provide individual, self-contained damming devices, one of which can be easily attached to each furrow-forming tool of an implement regardless of the number or spacing of tools in the implement.

It is highly desirable that the damming scraper be adapted to accumulate earth from only the sides of the furrow and leave undisturbed soft mulch at the bottom of the furrow to provide a soft bed for the seeds. Furthermore, when the damming device is used in conjunction with a planting implement it is, of course, necessary that the scraper does not disturb the seeds. Hence, it is a further object of this invention to provide a damming tool that is adapted to scrape earth from only the sides of the furrow and leave undisturbed the seed bed at the bottom.

These and other objects will be made apparent by a consideration of the following description in which illustrative embodiments of my invention will be described, reference being had to the appended drawings in which.

Figures 1, 4:
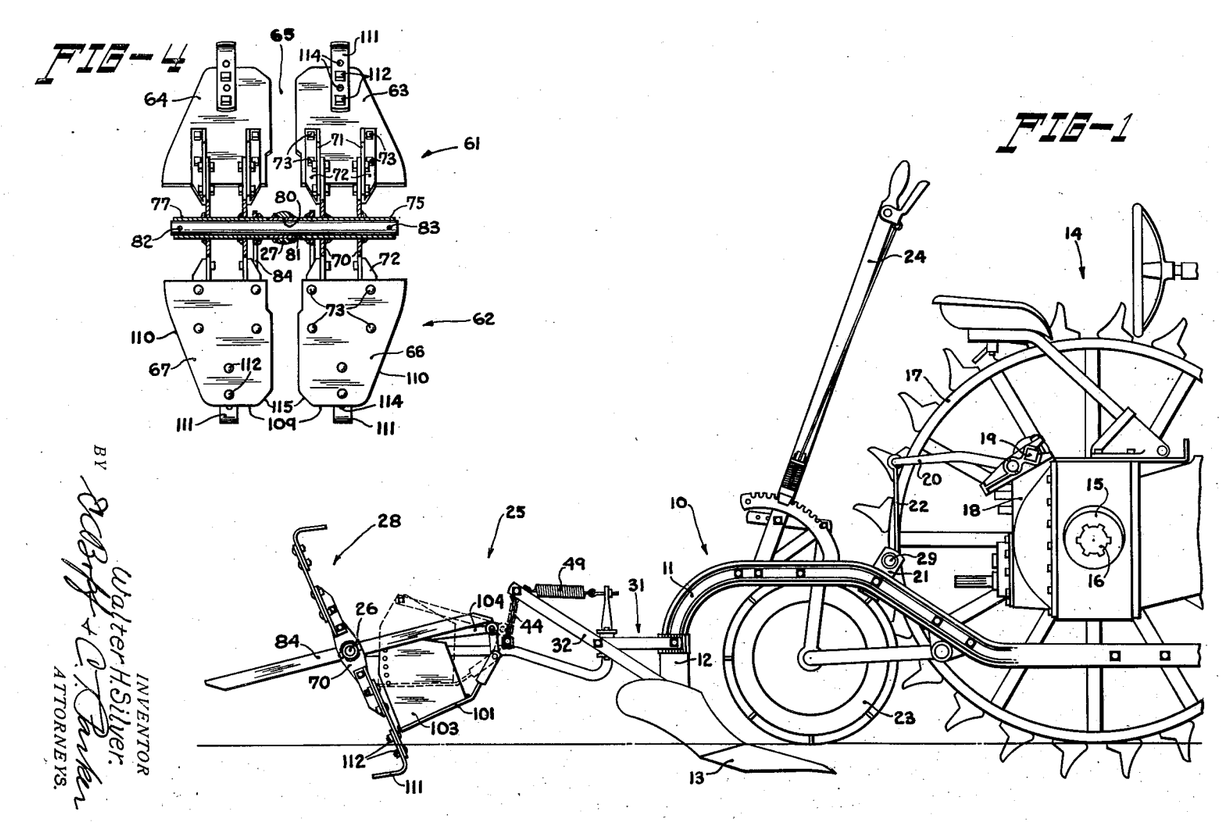
Figure 1 is an elevational view of a tractor-mounted lister to which is attached a damming device embodying the principles of my invention.
Figure 4 is a front elevation taken along the line 4—4 of Figure 2.
Figure 5:
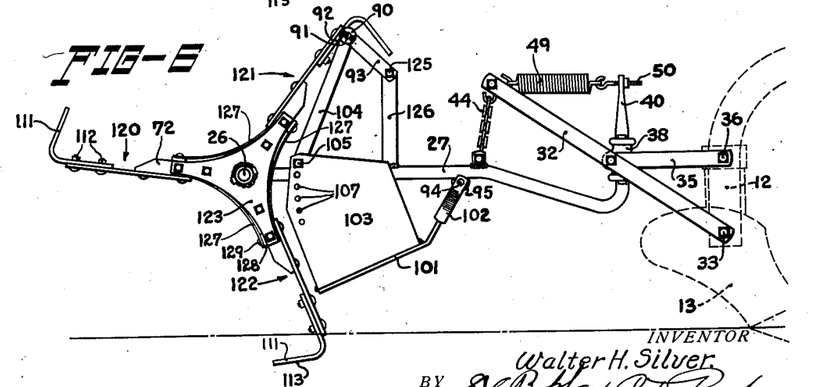
Figure 5 is a plan view of a two-bottomed lister, each bottom having a damming attachment of a modified design having three blades instead of two; and, Figure 6 is a side elevation of the three-bladed damming device.

Referring now to Figures 1 and 5, reference numeral 10 indicates in its entirety a furrow-forming implement, in this case a lister, comprising a pair of longitudinally extending beams 11, to the rear shank 12 of each of which is attached a lister bottom 13. The beam 11 extends forwardly to a point of attachment with a tractor 14, of which only the transmission housing 15, and the rear axle 16 on which is mounted rear traction wheels 17, appear in this view.

The forward ends of the beams 11 are bolted to a transverse structural supporting member 9, which is hingedly connected to a forwardly extending bracket 8 fixed to the tractor 14 by bolts 7, and an upwardly extending bracket 6 which is also attached to the body of the tractor. The member 9 is swingable relative to the brackets 6, 8 by virtue of the hinge connections, 4, 5, thereby providing for vertical swinging of the beams 11. Each beam is stabilized by a lateral bracing member 3 which is clamped to the transverse member 9 to provide a point of lateral support. For a more complete disclosure of the specific means for connecting the beams 11 to the tractor, reference may be had, if so desired, to my copending application Serial No. 747,261, filed September 29, 1934.

The lister is raised out of earth-engaging position by the power lift mechanism of the tractor 14. The power lift mechanism, the details of which are well known in the art, is bolted to the rear of the transmission housing 15 and transmits power through a rock shaft 19 to a pair of lifting arms 20. The lifting arms are connected by means of rods 22 to a transverse shaft 29, which carries one of the beams 11 at each end thereof, by means of brackets 21. (See Fig. 5.)

The depth of operation of each lister bottom 13 is determined by a gauge wheel 23, which is adjustable by means of a hand lever 24, in a conventional manner. Adjustment of one of the tools 13 relative to the other also effects a corresponding adjustment of the damming device connected thereto. Since each damming attachment is self-contained and has no operating connections with the other device, an adjustment of one device does not disturb the control mechanism of the other.

Figure 2:
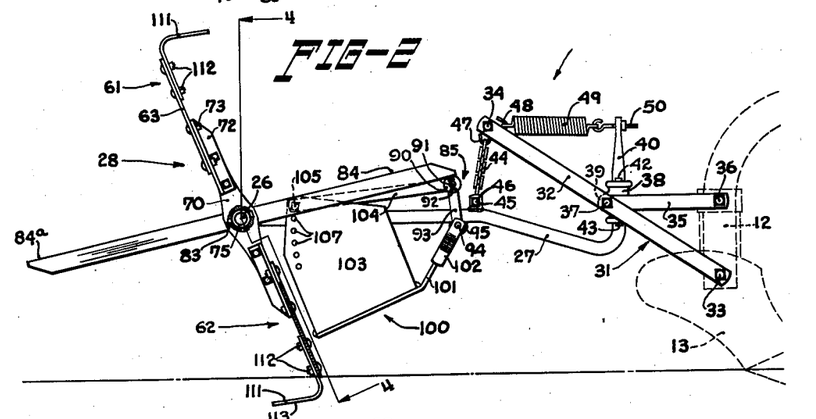
Figure 2 is an elevational view of the damming device drawn to a larger scale.
Figure 3:
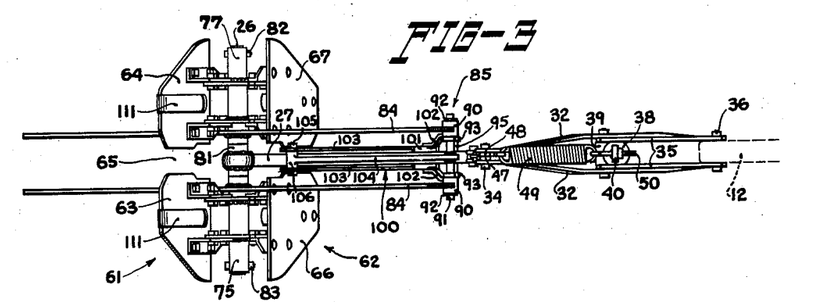
Figure 3 is a plan view of the device shown in Figure 2.

Referring now to Figures 2 and 3, the damming device, indicated generally by the reference numeral 25, comprises a rotary scraper assembly 28 mounted for rotation on a transverse shaft 26 carried at the rear end of a longitudinally extending draft member 27. The draft member 27 is connected for universal swinging movement to a bracket 31, rigidly attached to the shank 12 of the lister. The bracket 31 comprises a pair of strap members 32 connected at their lower ends on opposite sides of the shank 12 by a bolt 33 and extending diagonally upwardly and rearwardly therefrom. The upper ends of the strap members converge and are bolted together by a bolt 34. A pair of bracing members 35 is fixed to the upper portion of the shank 12 on opposite sides, respectively, by a bolt 36 and extend horizontally rearwardly to the diagonal members 32, to which they are secured by a bolt 37.

The universal joint connection between the draft beam 27 and the bracket 31 is accomplished by means of a thimble member 38 which slidably embraces the upturned forward end 40 of the draft beam 27. The thimble member 38 has a projecting lug 39 in which is provided an aperture to receive the bolt 37. The thimble member is thus secured between the strap members 32 and is swingable in a vertical plane about the transversely extending bolt 37, thereby providing for vertical swinging movement of the draft member 27. Lateral swinging of the beam is accommodated by the spindle portion 40 turning within the thimble 38. The spindle portion 40 is prevented from sliding axially through the thimble 38 by a pair of pins 42, 43 inserted through apertures in the spindle 40 at each end of the thimble 38, respectively. Swinging movement of the beam 27 in a downward direction is limited by a supporting chain 44 connected to a lug 45 on the beam by a bolt 46, the upper end of the chain being connected by a hook 47 to the bolt 34 between the upper ends of the strap members 32. By hooking different links of the chain 44 to the hook 47, adjustments can be made of the limit of downward swinging movement of the beam 27. A second hook 48 is secured to the bolt 34 adjacent to the hook 47 and engages the end of a coil spring 49, the other end of which is secured to the upper end of the spindle 40 of the beam 27 by means of an eyebolt 50. The tension of the spring 49 urges the beam 27 toward its extreme lower position as limited by the chain 44 and thus has the effect of additional weight on the scraper assembly 25 for yieldably holding it in earth-engaging position, but the beam is free to rise over obstructions independently of the implement 13, and to swing laterally to permit the damming tool 25 to follow in the furrow formed by the implement. When the implement 13 is raised out of the furrow by the power lift 18, the damming scraper 28 is also raised to inoperative position through the bracket 31 and the chain 44.

The damming tool 28 comprises an assembly of radially outwardly extending scraper tools. The device shown in Figures 1 to 4 has two of such tools 61, 62 spaced 180° apart.

Each of the tools comprises a pair of complementary blades, disposed side by side. As viewed in Figure 4, the tool 61, which is shown in raised or inoperative position, comprises a right hand blade 63 and a left hand blade 64 disposed substantially coplanar and spaced apart laterally to provide a space or slot 65 between them to receive the draft beam 27 during rotation of the assembly. Similarly, the tool 62 in operative, or earth-engaging position, comprises complementary right and left hand blades 66, 67, respectively.

The two right hand blades 63, 66 of the tools 61, 62, are fixed at opposite ends of a pair of arms 70 which are bolted respectively to the outwardly turned flanges 71 of the angle brackets 72, attached in laterally spaced relation to each of the plates 63, 66, respectively, by bolts 73. Each of the arms 70 is apertured at the center to receive a tubular hub 75, which consists preferably of a short section of pipe, to which the arms 70 are welded or otherwise suitably fixed.

The two left hand blades 64, 67 of the respective tools 61, 62, are similarly connected to opposite ends of like supporting arms 76, which are welded in laterally spaced relation to a pipe section 77.

The rear end of the draft beam 27 contains a transverse opening 80, within which is welded a short nipple 81, serving as a journal for the shaft 26, which fits slidably within the nipple. The assembly is completed by sliding each of the pipe sections 75, 77 upon opposite ends of the shaft 26, respectively, into abutment with opposite ends of the nipple 81. After the two pairs of complementary blades have been aligned laterally, the pipe sections 75, 77 are fixed rigidly to the shaft 26 by inserting pins 82, 83 through aligned openings in the pipe sections and shaft, thereby combining the blades and the shaft into one unitary structure which is rotatable relative to the beam 27.

The nipple 81 serves not only as a bearing for the shaft but also as a spacer between the pipe sections to maintain the blades 63, 66, on one side of the unit, in a fixed laterally spaced relation to the blades 64, 67 on the other side of the unit to provide the opening or slot 65 between them in order that the blades clear the beam 27 as the unit rotates.

During earth-engaging operation, the blades are held against rotation in the position shown in Figures 1 and 2, sloping upwardly at a slight angle rearwardly from the vertical, one tool 62 being held in earth-engaging position while the other tool 61 is in inoperative position. The unit is held in this position by a pair of stop arms 84, fixed respectively to the pipe sections 76, 77, and engaged by a detent member 85. Each of the arms 84 comprises a strap having an aperture at the center through which the respective pipe section is inserted and the strap welded thereto, substantially at right angles to the blade-supporting arms 70.

The detent member 85 comprises a pair of rollers 90 rotatably mounted on opposite ends, respectively, of a transversely extending shaft 91 and suitably secured by cotter pins 92. The shaft 91 is rigidly supported on a pair of laterally spaced arms 93 to which it is welded, the arms being pivoted by means of a transversely disposed pin 94 to a lug 95 welded to the under surface of the draft beam 27.

The detent member in operative position, as shown in Figure 2, underlies the ends of the stop arms 84, which bear upon the rollers 90. Forward movement of the damming device results in a reaction of the earth-engaging tool 62 against the ground, which tends to cause a clockwise rotation of the assembly as viewed in Figure 2 but which is prevented by the detent member 85. However, by rotating the detent forwardly, or in a clockwise direction, the rollers pass from under the end of the arms 84, thereby freeing the arms 84 and allowing the unit 28 to be rotated clockwise by the reaction of the soil against the forward travel of the tool.

The detent member 85 is swung into a disabled position by means of a member 100 for gauging the amount of earth collected in front of the tool, comprising a gauging arm 101 pivoted to the draft beam 27 and connections between the arm 101 and the detent member 85, as will be described. The gauging arm 101 is shown in the form of a strap, welded to a pair of supporting arms 102 which are swingably mounted on the pivot pin 94 on the draft beam 27, the arm extending downwardly and rearwardly with the flat sides of the strap disposed transversely, thereby providing a flat paddle for contacting the earth accumulated in front of the tool.

A pair of vertically extending plates 103 are secured to the edges of the gauging arm 101 and stand on opposite sides of the draft beam 27, respectively. The plates are secured to a forwardly extending arm 104 by a bolt 105 extending through a selected one of a number of apertures 107 in the plates and an aligned opening in a lug portion 106 at the rear end of the arm 104. The forward end of the arm 104 is rigidly fastened as by welding to the detent shaft 91.

Thus, the gauging arm 101, the plates 103, the arm 104, and the detent arms 93 complete a generally four-sided rigid structure which is swingable in a vertical plane about the pivot bolt 94. Since the weight of this structure is centered to the rear of the pivot 94, the gauging arm 104 tends to swing downwardly and forwardly in a counterclockwise direction as viewed in Figure 2. This movement is limited by the lug 106 of the arm 104, which rests upon the draft beam 27.

As the tool 62 collects earth from the sides of the furrow, the accumulated earth builds up in a pile in front of the blades and underneath the gauging arm, thereby forcing the arm upwardly. The plates 103 prevent earth from piling upon and burying the arm. As the arm is raised by the earth, the detent member 85 is swung forwardly about the pivot 94 until the rollers 90 have cleared the ends of the stop arm 84, whereupon the reaction of the collected earth against the forward motion of the blades rotates the scraper assembly 28 as the implement progresses forwardly, the heretofore operative tool 62 being raised to inoperative position, depositing the earth in the furrow to form a dam. The heretofore inoperative tool 61 is, by the rotary movement of the assembly 28, swung downwardly in front of the dam into earth-engaging position, where it is arrested by the end 84a of the stop arm 84 coming into engagement with the detent member 85, which has been returned to normal position by the weight of the gauging arm 104 as it slides off the top of the dam.

The height to which the gauging arm must be raised in order to trip the detent can be adjusted by removing the bolt 105 and adjusting the angular relation between the arm 104 and the detent arms 93, whereupon the bolt 105 is reinserted through a different aperture 107. The apertures 107 are arranged in a circular arc about the pivot 94 as a center. Thus it may be said that the arm 104 effectively gauges the height of each dam and releases the rotary assembly 28 to deposit the earth in the furrow when it has accumulated to a predetermined height. The operation of the device is therefore independent of the distance traveled by the implement but produces dams of the predetermined height just as close together as the tool can make them.

It has been mentioned that it is desirable to collect substantially all of the earth for the dams from the sides of the furrow and leave the soft mulch in the bottom of the furrow undisturbed for the seed bed. To this end, the earth-engaging outer edges 110 of the blades (see Fig. 4) are made sloping at approximately the same angle to each other as the angle enclosed by the sides of a furrow, whereby the sides of the furrow are uniformly engaged to scrape off the surface to make the dams. The depth of engagement of the tool edges 110 in the sides of the furrow can be adjusted by means of a pair of runner shoes 111, one shoe being fastened to the blunted end 109 of each blade by bolts 112 inserted through aligned apertures in the shoes and in the blades. The shoes 111 comprise straps extending outwardly from the ends of the blades and bent approximately at right angles to form a runner portion 113 which trails in the furrow bottom and spaces the ends of the blades from the bottom, thereby preventing the blades from cleaning out the furrow bottom, and leaving a seed bed of soft mulch. A row of spaced apertures 114 provide means for adjusting the extent to which the shoes 111 project beyond the end 109 of the blades. By removing the bolts 112, the shoes 111 can be adjusted relative to the blades, which are then resecured by inserting the bolts 112 through others of the openings 114. Adjusting the extent of projection adjusts the depth in the furrow at which the tool operates, and hence the depth of engagement of each of the sloping edges 110 in the sides of the furrow.

Where the seeds are planted in the center of the furrow, further precaution against disturbing the seed bed is taken by beveling off the adjacent corners 15 at the ends of each pair of cooperative blades, which, in conjunction with the slot 65 between the blades, gives additional assurance that sufficient loose earth will be left all along the furrow in which to plant the seeds.

Referring now to Figures 5 and 6, when three tools 120, 121, and 122 are provided in a rotary unit instead of two, the stop arms 84 are eliminated, the detent rollers 90 bearing directly upon the ends of the blades. The two sets of complementary blades are supported on short pipe sections 75, 77 as in the first embodiment, but by means of generally triangular spider members 123 however, instead of on arms 70. The tools in this embodiment extend outwardly radially and spaced 120° apart. The details of construction are similar to those in the first embodiment in other respects, such as the method of mounting the pipe sections on the shaft 26, the brackets 72 for fastening the blades on the spiders 123, and the runner shoes 111 and the adjustable attaching means.

An additional feature in this three-blade design is a curved shield 127 which is coextensive in width with each blade and extends from the inner end of each blade, to which it is fastened by the rivets 73, around to the ends of the next succeeding of the spiders 123, where it is secured to brackets 128 by rivets 129. The shields 127 are thus virtually extensions of the blades and present concave surfaces which round off the tops of the dams as the scraper assembly rotates to deposit the accumulated earth. The advantage of smooth, rounded dams over those having rough irregular tops is that the former shed rainfall more effectively and are slower to disintegrate during rainfal.

A somewhat different arrangement of the detent mechanism is required because of the omission of the stop arms 84. The roller shaft 91 is supported on a pair of spaced arms 93 welded thereto, as in the first embodiment, but the arms 93 are swingably connected by a pivot bolt 125 to the top of an upright support 126 which is welded to the draft beam 27. Thus the detent arms 93 are mounted in a position suitable for swinging the rollers into or out of engagement with the upper blades of the tools. The arm 104 which connects the plates 103 with the detent roller shaft 91 is disposed in a more nearly vertical position in this embodiment than that previously described, but its construction and function is similar to those described, and has means for adjustment as described.

Figure 6 illustrates the flexibility of arrangement of damming devices of my invention. Instead of a bulky tool-carrying frame which is adaptable to only one implement having a like number of furrow-forming implements on a like spacing, my device comprises merely a light frameless unit which can be easily attached directly to the shank of the furrow-forming tool. By connecting an individual damming unit to each tool shank, the spacing of units is inherently taken care of, and the self-contained control mechanism obviates the necessity of any adjustments of connections between the units. By supporting the units on the respective tool shanks in the manner described, each unit is made a part of the furrow-forming tool so that when the tool is in operative position the damming scraper is always operative, while both the tool and the scraper are raised to inoperative position together, independent of any other tool or damming device.

A particular advantage of pivotally connecting each damming device independently to its furrow-forming implement is that when operating in curved furrows, each damming tool remains substantially normal to the walls of the furrow, while it freely follows in the furrow made by the furrow-forming implement. In this way, the depths of engagement of the scraper on each side of the furrow are maintained substantially equal on curves as well as in straight furrows.

I do not intend my invention to be limited to the exact details shown and described herein. What I desire to protect by Letters Patent of the United States is set forth in the following claims.

I claim:

1. In a device for collecting earth including a scraping tool movable into and out of earth-engaging position, means responsive to the height of the pile of earth collected by said tool for controlling the movement of the tool out of earth-engaging position, said controlling means being adjustable to operate selectively responsive to various predetermined heights of collected earth.

2. A damming device comprising in combination a draft member, a transversely extending shaft carried thereby, an assembly of radially extending earth-collecting blades rotatably mounted on said shaft to be successively disposed in earth-engaging position, detent means for preventing rotation of said assembly as the latter is moved with any one of said blades in earth-engaging position, and control means responsive to the height of the earth collected, for disabling said detent means thereby allowing said assembly to rotate whereby the collected earth is deposited as a dam, said control means comprising a gauge arm disposed in front of said tool and pivotally mounted on said draft member and operatively connected to said detent means.

3. A damming device comprising in combination a draft member, a transversely extending shaft carried thereby, an assembly of radially extending earth - collecting blades rotatably mounted on said shaft, detent means for preventing rotation of said assembly as the latter is moved with one of said blades in earth-engaging relation, a gauging arm pivotally mounted on said draft member for gauging the amount of earth collected by the tool, and means for adjustably connecting said arm to said detent member in various fixed relative positions, said gauging arm being adapted to disable said detent means when the pile of earth collected by said tool reaches a predetermined height.

4. A damming device comprising in combination, a rotary damming tool assembly including a plurality of radially extending blades, a supporting shaft therefor, said assembly being rotatably mounted on said shaft, a draft beam connected with said assembly, a supporting frame for said beam, means for pivotally mounting said beam on said frame to provide for vertical movement of said assembly relative to said frame, means for limiting the extent of downward pivotal movement of said beam, and means for yieldably urging said beam toward said lower limit.

5. A damming attachment for an earth-engaging implement comprising in combination, a supporting bracket adapted to be fixed to said implement, a draft member having an upwardly extending spindle, universal joint means for connecting said spindle to said bracket providing for universal movement of said beam relative to said bracket, means for limiting the extent of downward movement of said beam, spring means connected between the upper end of said spindle and said bracket for urging said beam toward the limit of downward movement, and an earth-collecting tool mounted on said beam.

6. A damming attachment for an earth-engaging implement comprising a draft beam, means for attaching said draft beam to said implement, and a rotary damming scraper assembly rotatably mounted on said beam, said assembly comprising a shaft supported on said beam and extending laterally from each side thereof, and a plurality of earth-collecting tools supported on said shaft and extending radially outwardly therefrom, each of said tools comprising a pair of cooperative blades disposed on opposite sides of said beam, respectively, and spaced apart to provide a slot between them to receive said beam during rotation of said assembly about the axis of said shaft.

7. A damming attachment for a furrow-forming implement, comprising a draft beam, means for attaching said beam to said implement, and a rotary damming scraper assembly rotatably mounted on said beam and adapted to trail behind said implement in the furrow formed thereby, said assembly comprising a shaft supported on said beam and extending laterally from each side thereof, and a plurality of earth-collecting tools supported on said shaft and extending radially outwardly therefrom, each of said tools comprising a pair of cooperative blades disposed on opposite sides of said beam, respectively, and spaced apart to provide a slot between them to receive said beam during rotation of said assembly about the axis of said shaft, the outer lateral edge of each of said blades sloping inwardly toward the outer end of said blade to fit the side of the furrow, and a runner shoe fixed to the outer end of at least one blade of each of said blade members for spacing said blades from the bottom of the furrow when in earth-engaging position, to prevent the blades from scraping the mulch from the bottom of the furrow.

8. A damming attachment for a furrow-forming implement, comprising a draft beam, means for attaching said beam to said implement, and a rotary damming scraper assembly rotatably mounted on said beam and adapted to trail behind said implement in the furrow formed thereby, said assembly comprising a shaft supported on said beam and extending laterally from each side thereof, and a plurality of earth-collecting tools supported on said shaft and extending radially outwardly therefrom, each of said tools comprising a pair of cooperative blades disposed on opposite sides of said beam, respectively, and spaced apart to provide a slot between them to receive said beam during rotation of said assembly about the axis of said shaft, the outer lateral edge of each of said blades sloping inwardly toward the outer end of said blade to fit the side of the furrow, a runner shoe fixed to the outer end of at least one blade of each of said blade members for spacing said blades from the bottom of the furrow when in earth-engaging position, to prevent the blades from scraping the mulch from the bottom of the furrow, a detent member for holding said rotary assembly against rotation during earth-collecting operation, and a gauging arm swingably mounted on said draft beam and operatively connected with said detent member, whereby said gauging arm is adapted to disable said detent member when a pile of earth of a predetermined size is collected in front of the tool, thereby allowing said rotary assembly to rotate and deposit said pile in the furrow to form a dam.

9. A damming device adapted to be propelled in a furrow for scraping the sides of the furrow to accumulate loose earth therefrom for making dams in the furrow, comprising a scraping tool having sloping lateral edges adapted to fit the sides of the furrow, a blunt end on said tool and a runner shoe attached to said end to space the end of the tool from the bottom of the furrow to avoid disturbing the seed bed therein, said tool being movable into and out of earth-engaging position, draft means for said tool and means for controlling the movement of the tool out of earth-engaging position to deposit said accumulated earth.

10. In combination with an implement having a furrow-forming tool and means for lowering and raising said tool into and out of earth-engaging position, a damming device comprising a scraper blade supported on said implement for lateral swinging movement relative thereto and raised and lowered simultaneously with said tool, said blade being movable into and out of earth-engaging position independent of the tool when the latter is in earth engaging position, and means associated with said scraper blade and actuated by the earth moved by said blade, for controlling said independent movement thereof.

11. In combination with an implement comprising a plurality of furrow-forming tool carrying beams and means for raising and lowering each of said beams independently, a damming device attached to each of said beams, respectively, each damming device being supported entirely on its respective tool beam when the latter is in raised position and movable into and out of earth-engaging position independent of said tool beam when the latter is in lowered position.

12. A damming device adapted to be propelled in a furrow for scraping the sides of the furrow to accumulate loose earth therefrom for making dams in the furrow, comprising a rotary scraping tool having at least three radially outwardly extending scrapers spaced angularly about a common axis of rotation, and a curved shield disposed as an extension on each of said scrapers, each of said shields extending from one of said scrapers, respectively, across said axis and terminating adjacent to the next of said angularly spaced scrapers, said shields providing means for rounding off the top of each of said dams as the latter is deposited in the furrow.

13. A damming device adapted to be propelled in a furrow for scraping the sides of the furrow to accumulate loose earth therefrom for making dams in the furrow, comprising a rotary scraping tool having at least three radially outwardly extending scrapers spaced angularly about a common axis of rotation, and plate means interconnecting the inner ends of each two adjacent scrapers providing a substantially continuous surface between scrapers for smoothing the top of each dam as the rotary tool rotates to deposit the accumulated earth.

14. In combination with an implement comprising a plurality of furrow-forming tool-carrying beams and means for raising and lowering each of said beams independently, a damming device attached to each of said beams, respectively, each damming device being supported entirely on its respective tool beam free of the ground when the beam is in raised position and movable into and out of earth-engaging position independent of said tool beam when the latter is in lowered position, each of said damming devices having independent means for controlling the movement of said damming device into and out of earth-engaging position.

15. The combination with an implement comprising a plurality of furrow-forming tools, of damming mechanism comprising a separate damming unit associated with each tool, each unit comprising a ground-engaging scraper positioned to operate in the furrow made by the tool with which it is associated, means pivotally connecting each unit with said implement for both lateral and vertical swinging relative to the implement and independently of one another, and means for simultaneously raising all of said scrapers from ground-engaging position with their associated furrow-forming tools.

16. In combination with an implement comprising a fore and aft extending beam, a ground-working tool mounted thereon, lifting means engaging said beam for lowering and raising said tool into and out of earth-engaging position, a damming device comprising a scraper blade attached to said tool beam and raised and lowered as a unit with said beam by means of said lifting means, said blade being movable into and out of earth-engaging position independent of the tool when the latter is in earth-engaging position, means for gauging the height of accumulated material in front of said blade, and means associated with said scraper blade and actuated by said gauging means for controlling said independent movement of the blade.

17. In combination with an agricultural implement comprising a frame, a vertically disposed ground-working tool-carrying shank supported on said frame and movable vertically relative thereto, lifting means connected to said shank for lowering and raising the latter between operative and inoperative positions, a damming device comprising a supporting member attached to said tool-carrying shank, a scraper blade mounted on said member, said member and said blade adapted to be raised and lowered with said shank by means of said lifting means, said blade being movable into and out of earth engaging position independent of said tool-carrying shank when the latter is in said operative position, means for gauging the height of accumulated material in front of said scraper blade, and means actuated by said gauging means for controlling said independent movement of said blade.

18. A damming device comprising in combination, a draft member, a scraper including at least one earth collecting blade rotatably mounted on said member, detent means for preventing rotation of said scraper as the latter is moved with said blade in earth engaging relation, and control means comprising a gauge arm disposed in front of said tool and pivotally mounted on said draft member to swing upwardly as the height of the pile of collected earth increases, and means connecting said arm with said detent means for disabling the latter when said pile reaches a certain height, thereby allowing said scraper to rotate whereby the collected earth is deposited to form a dam, said gauge arm being adjustable relative to said detent means to provide for forming dams of different heights.

19. A damming device comprising a draft beam, a shaft supported on said beam and extending laterally on opposite sides thereof, and a damming tool supported on said shaft and rotatable relative to said beam about the axis of said shaft, said tool comprising a pair of blades disposed on opposite sides of said beam, respectively, and spaced apart to provide a slot between them to receive said beam during rotation of said tool.

20. A furrow damming device comprising a draft beam, a scraper blade mounted thereon and adapted to scrape the sides of a furrow to accumulate earth therefrom and movable to an inoperative position to deposit said earth to form a dam in the furrow, and a depth gauging shoe fixed to said blade to determine the depth to which said blade operates in said furrow.

21. A furrow damming device comprising a draft beam, a scraper blade mounted thereon and adapted to scrape the sides of a furrow to accumulate earth therefrom and movable to an inoperative position to deposit said earth to form a dam in the furrow, a depth gauging shoe, and means for adjustably fixing said shoe in a position extending below said blade to adjustably space the latter from the bottom of the furrow.

22. A damming device comprising a draft beam, a shaft supported on said beam and extending laterally on opposite sides thereof, at least one scraper blade mounted on said shaft on each side of said beam, said blades being rotatable about the axis of said shaft as the implement moves forwardly, a detent member mounted on said beam and movable relative thereto for intermittently restraining and releasing said blades with respect to rotation, and control means for actuating said detent member.

23. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, and releasable detent means mounted on said draft member for intermittently restraining and releasing said blades.

24. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a control lever pivoted on said draft member, and a detent supported on said lever and extending transversely to bear upon both of said blades.

25. A damming device comprising a single draft member, a transverse shaft rotatably supported thereon, and extending laterally on opposite sides thereof, a pair of earth engaging blades fixed to said shaft on opposite sides of said draft member, respectively, a detent member pivotally mounted on said draft member and means for rocking said detent member to intermittently restrain and release said blades.

26. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a control arm pivoted on said draft member, a transversely extending detent supported on said lever, rollers on said detent adapted to bear upon each of said blades and means for intermittently swinging said control lever to engage said rollers therewith and disengage them therefrom.

27. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a control arm pivoted on said draft member, a detent supported on said arm and adapted to restrain said blades from rotation, a gauging arm disposed in front of said blades and pivoted to said draft member, and link means connecting said gauging arm with said detent.

28. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a detent member pivoted on said draft member and engageable with said blades to hold the latter in earth engaging position, a gauging arm disposed in front of said blades and pivoted on said draft member for gauging the height of the earth collected by said blades, a pair of guide members fixed to said gauging arm and extending upwardly on opposite sides of said draft member, and means connecting said guide members with said detent member.

29. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a detent member pivoted on said draft member and engageable with said blades to hold the latter in earth engaging position, a gauging arm disposed in front of said blades and pivoted on said draft member for gauging the height of the earth collected by said blades, and means interconnecting said detent member and said gauging arm for disabling the latter when the collected earth reaches a predetermined height, said interconnecting means including means for adjusting the effective length thereof, for adjusting the height of the dams.

30. A furrow damming device comprising a draft beam, a shaft supported on said beam and extending laterally on opposite sides thereof, a furrow damming tool supported on said shaft comprising a pair of complementary blades disposed on opposite sides of said draft member on said shaft and rotatable thereon, and adapted to operate both in the same furrow with the outer edges of said blades in engagement with the opposite sides of said furrow, respectively, a detent member pivoted on said draft member and engageable with said blades to hold the latter in earth engaging position, a gauging arm disposed in front of said blades and pivoted on said draft member for gauging the height of the earth collected by said blades, a pair of guide members fixed to said gauging arm and extending upwardly on opposite sides, respectively, of said draft member, link means pivoted to said detent member, and bolt means for connecting said link means to said guide members, said bolt means being disposed above said draft member and engageable therewith to provide a stop for limiting downward movement of said gauging arm.

31. A dammer comprising a support, a scraping blade unidirectionally rotatably mounted on said support and adapted to be held in earth-engaging position for accumulating a pile of earth in front of the blade, a gauge arm for gauging the height of the pile, said arm being pivotally mounted on said support in front of said blade and extending rearwardly to lie on top of the pile, and means actuated by the pivotal movement of said arm, for controlling the rotation of said blade out of earth-engaging position.

32. A dammer comprising a support, a scraping blade unidirectionally rotatably mounted on said support and adapted to be held in earth-engaging position for accumulating a pile of earth in front of the blade, a gauge arm for gauging the height of the pile, said arm being pivotally mounted on said support in front of said blade and extending rearwardly to overlap the path of revolution of the outer end of said blade and offset axially with respect to one side of the blade to avoid interference with the blade during rotation of the latter, and means actuated by the pivotal movement of said arm, for controlling the rotation of said blade out of earth-engaging position.

33. A dammer comprising a support, a scraping blade unidirectionally rotatably mounted on said support and adapted to be held in earth-engaging position for accumulating a pile of earth in front of the blade, a gauge arm for gauging the height of the pile, said arm being mounted for pivotal movement relative to said support and offset axially with respect to one side of the blade to avoid interference with the rotation of the blade, and means actuated by the pivotal movement of said arm for controlling the rotation of the blade out of earth-engaging position.

34. A dammer comprising a scraping blade unidirectionally rotatably mounted on said support and normally locked in earth-engaging position for accumulating a pile of earth in front of the blade, a gauge arm for gauging the height of the pile, said arm being mounted for pivotal movement relative to said blade and disposed to rest upon the pile, means actuated by the pivotal movement of said arm for releasing said blade for rotation of the blade relative to said arm and out of earth-engaging position, said arm being offset with respect to said blade to permit such rotation of the blade.

35. A dammer comprising a support, a scraping tool having a generally radially extending slot mounted on said support for unidirectional rotation and adapted to be held in earth-collecting position for accumulating a pile of earth in front of the tool, a gauge arm for gauging the height of the pile, said arm being mounted for pivotal movement relative to said support and disposed in line with said slot so as to pass therethrough during rotation of said tool, and means actuated by the pivotal movement of said arm for releasing said tool for rotation out of earth-collecting position.

36. In combination, a scraping tool adapted to be propelled in an earth-engaging position for accumulating a pile of earth in front of the tool and having a radially extending slot, means for supporting said tool for unidirectional rotation out of earth-engaging position to deposit said pile, a gauge arm disposed in line with said slot so as to pass therethrough during the rotation of said tool, said arm being pivotally mounted on said supporting means in front of said tool for gauging the height of the pile, and means actuated by the pivotal movement of said arm for controlling the movement of said tool out of earth-engaging position.

WALTER H. SILVER.